United States Patent [19]
Tamura et al.

[11] 3,887,747
[45] June 3, 1975

[54] NEW HOLLOW FILAMENTARY STRUCTURES

[75] Inventors: Yoshio Tamura; Koichiro Ohtomo, both of Takatsuki, Japan

[73] Assignees: Kanebo Ltd., Tokyo; Nippon Kynol Inc., Osaka, both of Japan

[22] Filed: Feb. 21, 1973

[21] Appl. No.: 334,203

[30] Foreign Application Priority Data
Feb. 24, 1972  Japan.............................. 47-19458

[52] U.S. Cl. ................. 428/229; 264/29; 264/176; 264/344; 264/DIG. 19; 260/2.1; 260/2.2; 428/398; 428/292
[51] Int. Cl. .......................... B28b 3/20; D02g 3/00
[58] Field of Search ............ 161/172, 178; 260/2.1, 260/2.2, 2.5 M, 236, 347; 264/41, 45, 47, 317, 340, 344, 176

[56] References Cited
UNITED STATES PATENTS
3,650,102   3/1972   Economy et al................ 161/172 X
3,716,521   2/1973   Economy et al................. 260/51 R

*Primary Examiner*—George F. Lesmes
*Assistant Examiner*—Lorraine T. Kendell
*Attorney, Agent, or Firm*—Sherman & Shalloway

[57]           ABSTRACT

A process for producing a hollow carbon or ion-exchange filament which comprises treating a filament consisting of a fiber-forming polymer of predominantly an uncured novolak resin composition with a curing reagent in the presence of a curing catalyst to effect the cure of the filament extending from the peripheral portion to the axial portion thereof to a depth of 20–90% of the cross-sectional area of the filament, removing the uncured core portion of the filament by extraction with a solvent, and then subjecting the resulting hollow novolak resin filament to a carbonization treatment or introducing an ion-exchangeable group into the resulting hollow novolak resin filament; and products produced by this process.

10 Claims, No Drawings

NEW HOLLOW FILAMENTARY STRUCTURES

This invention relates to a new hollow filamentary structure, particularly to a new hollow carbon filament having excellent adsorption activity and a new hollow ion-exchange novalak resin filament having improved ion-exchange capacity. This invention also relates to processes for producing these filament.

A certain hollow filamentary material has been known heretofore, but hollow carbon filament and hollow ion-exchange filament have not been known up to now.

It has been now found that the new hollow carbon or ion-exchange filament described above is easily provided by treating the hollow novalak resin filament recently developed and it comprises a filamentary polymer composed predominantly of a flame-resistant and antifusing cured novalak resin, the hollow structure of the filament continuously extending in the axial direction of the filament at a rate of hollowness in the range of 10–80%. The nonhollow carbon filament has been known heretofore. However, since an elevated temperature treatment was necessary in the case of the production of the carbon filaments, the hereinbefore-described conventional methods of producing hollow filaments could not be employed. Hence, the hollow carbon filament has not been put to practical use as yet.

While active carbons has been utilized as a decoloring agent, a deodorizing agent, a catalyst or a catalyst carrier, in recent years there has been a rapid increase in its uses for the prevention of pollution in connection with the increasing discharge of smoke and water with the development of industry. However, since the so-called active carbon is either in powder or granular form, it has the shortcoming that its filtrability is unsatisfactory and its regenerative efficiency is poor. Moreover, it is relatively expensive. Thus, its use is restricted. Consequently, there has been an intense desire for the appearance of a filamentary active carbon that can be conveniently handled and readily regenerated.

The hollow carbon filament that is provided by the instant invention can be produced at low cost and very readily on a commercial scale by carbonizing the hollow novalak resin filament mentioned above.

The hollow carbon filament thus obtained can not only be applied to the areas in which the conventional active carbon has been used, but also has the advantage that it can be utilized in new technical areas in which active carbon has not been applied hitherto because of its powder or granular form.

There has been used hitherto as an ion-exchange member consisting of organic high molecular material a resin which uses as its base, for example, a styrene-divinylbenzene type condensation product. While this resin possesses excellent exchange activity, it lacks moldability. Hence, it is used in most cases in a bead state. These beads have the shortcoming that they are susceptible to crumbling during their use, with the consequence that in carrying out the continuous treatment by passing a liquid through an ion-exchange column there are such shortcomings as the pressure loss becoming great or clogging taking place. For improving on these shortcomings and increasing the surface area per unit weight to thus enhance the speed of ion exchange, it has been proposed to use an ion-exchange fiber as in the case of the ion-exchange cellulose. However, with such deficiencies as the degree of swelling of the fibers increasing in concomitance with an increase in the volume exchanged, the poorness of the fibers' resistance to attack by chemicals and lowness of mechanical properties such as tenacity and elongation, there is as yet none that is satisfactory.

On the other hand, there is an urgent demand for the development of an ion-exchange fiber which, excelling in physical, chemical and biological properties, will demonstrate a very high activity as well as great treatment efficiency when used in the biochemical field or in the treatment of industrial wastes, which is becoming a problem in recent years, or in the removal of radioactive material.

In order to meet the foregoing demand, there has been developed an ion-exchange filament consisting of the nonhollow novolak resin filament, but there are such drawbacks that the speed of ion-exchange of this filament is not quite adequate yet and its flexural strength is weak.

It has been now found that by introducing an ion-exchangeable group into the hereinbefore-described hollow novolak resin filament, it was possible to obtain a hollow ion-exchange filament of great flexural strength whose ion-exchange capacity and ion-exchange speed have been tremendously improved over those of the foregoing ion-exchange filament whose base is a non-hollow novolak resin.

Therefore, one object of the invention is to provide a new hollow carbon filament having a high adsorption activity, which is derived from the foregoing hollow novolak resin filament; and also to a process for producing this hollow carbon filament.

Another object is to provide a new hollow ion-exchange novolak resin filament having an excellent ion-exchange activity, which is obtained by subjecting the foregoing hollow novolak resin filament to an after treatment; and also to a process for producing this hollow ion-exchange novolak resin filament.

Other objects and advantages of the present invention will become apparent from the following description.

A new hollow filamentary structure provided by the present invention is characterized in that it is of a continuous hollow structure extending along the axial direction of the filament, the rate (degree) of hollowness of which is 10 – 80%.

In this specification and appended claims, the term "rate (or degree) of hollowness," is defined as the ratio that the area of the hollow portion of a filament occupies relative to the cross-sectional area thereof as calculated from the outside circumference of the filament.

The new hollow filamentary structures of the present invention can be easily produced, for example, by treating the hollow novolak resin filament consisting of a filamentary polymer whose main component is a flame-resistant and antifusing cured novolak resin, the hollow structure of the filament continuously extending in the axial direction of the filament, the rate of hollowness being in the range of 10 – 80%.

The foregoing hollow novolak resin filament can be produced by treating a filament consisting of a fiber-forming polymer composed predominantly of an uncured novolak resin with a curing reagent in the presence of a curing catalyst to cure the filament from its peripheral portion towards the axial portion thereof to a depth of 20 – 90% of its cross-sectional area and thereafter removing the uncured portion of the central part of the filament by extraction with a solvent.

The hollow novolak resin filament of the present invention is a filament consisting predominantly of an intermolecularly cross-linked, flame-resistant and anti-fusing novolak resin in which the cross-sectional area of the filament is hollow (i.e., the central part of the filamentary section is a cavity), the rate of hollowness of which filament is 10 – 80%, preferably 30 –60%, and most preferably 40 – 55%. The present hollow novolak resin filament not only excels in such physical and chemical properties as flexural strength, resistance to attack by chemicals and insulation property but also is light and has a pliant handle.

The filamentary polymer compound predominantly of a novolak resin, which makes up the hollow novolak resin filament of the invention, may be constituted solely of the novolak resin, or it may be a blend of a novolak resin and up to 50% by weight of the polymer of a thermoplastic synthetic resin. When the latter is present, it is contained in an amount of at least 0.1% by weight, and preferably 1 – 40% by weight, especially 5 – 30% by weight, and most preferably 10 – 25% by weight.

The novolak resin is a resin which is uncured and fusible in the starting molten mixture and can be cured with a curing reagent after melt-spinning. The method of preparing the novolak resin is well known per se. It can be produced by heat-reacting a phenol with an aldehyde in the presence of an acidic catalyst or an alkali catalyst. Usually, the novolak resins have a number average molecular weight of about 300 to about 2,000. If desired, those having a larger molecular weight (for example, up to about 5,000) can be prepared. Therefore, as is well known, the predominantly novolak-type modified novolak resins obtained by any desired combination of the novolak-type reaction and the resol-type reaction can also be used. Furthermore, any desired combinations of phenols and aldehydes can be used, and different novolak resins each derived from a different combination of phenol and aldehyde can be used conjointly.

The phenols used for producing the novolak resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol, and mixtures of two or more of these phenols.

As hereinafter to be described, when it is desired to obtain a hollow novolak resin filament introduced with an ion-exchange group, this can be achieved by using as the starting material the foregoing phenols which have been substituted by an ion-exchange group such, for example, as the sulfonic acid group, carboxyl group, ammonium group, the primary, secondary or tertiary amino group, and the quaternary ammonium group.

The aldehyde most commonly used for polycondensing with the above phenols is formaldehyde, but the monoaldehydes and dialdehydes such as paraformaldehyde, hexamethylenetetramine, furfural, glutaraldehyde, adipoaldehyde and glyoxal can also be utilized.

The acidic catalyst used for the reaction of forming the novolak resins may be any known organic or inorganic acid, for example, hydrochloric acid, nitric acid, sulfuric acid, phosphoric acid, formic acid, p-toluenesulfonic acid, acetic acid, oxalic acid or phthalic acid.

The alkali catalyst used is, for example, sodium hydroxide, potassium hydroxide, ammonia, calcium hydroxide and the like.

The fiber-forming thermoplastic synthetic resin, which may constitute the other element of the hollow novolak resin filament of the present invention is preferably selected from the group consisting of the polyamide resins, polyester resins, polyolefin resins and polyurethane resins. Other fiber-forming thermoplastic synthetic resins can also be utilized in this invention. The term "fiber-forming thermoplastic synthetic resin," as used herein and the appended claims, is meant to include not only the individual resins mentioned above, but also blends of the different resins, copolymerized resins of these with minor amounts of other copolymerized comonomers, or the blends of the same resins of different monomeric combinations or molecular weights.

Of these fiber-forming thermoplastic synthetic resins, the polyamide resins are especially to be preferred in view of their good dispersibility in the novolak resin, good effects of improving the spinnability of the novolak resin and little likelihood of adversely affecting the flameresistant and anti-fusing properties of the novolak resin.

Specific examples of the fiber-forming thermoplastic synthetic resins that can be used in the invention include the polyamide resins such as nylon 6, nylon 11, nylon 12, nylon 66, nylon 610, nylon 611, nylon 612, and the blends of two or more of these with each other; the polyester resins such as polyethylene terephthalate, the polyesters derived from the same constitutent elements as polyethylene terephthalate with a part of the ethylene glycol replaced by other known glycols, the polyesters derived from the same constituent elements as polyethylene terephthalate with the terephthalic acid replaced by ortho- or meta-phthalic acid, other known aliphatic dicarboxylic acids or blends of two or more of these with each other; the polyester ethers such as polyethylene oxybenzoate, and the polyolefin resins such as polyethylene, polypropylene, an ethylene-propylene copolymer, or blends of two or more of these with each other.

The filament obtained by spinning a blend of these synthetic resins with the novolak resin in which the synthetic resins are contained in an amount of 0. – 50% by weight based on the total weight of the polymer have the advantage that its tensile strength, dyeability, elongation and abrasion resistance are much greater than in the case of the filament obtained from the novolak resin alone. While the use of a fiber-forming polymer in which the amount blended of the synthetic resin exceeds 50% by weight is permissible, this is not desirable, since in the case of a filament prepared from such a polymer there is a possibility of difficulty being encountered in the elution and removal of the uncured resin during the hereinafter to be described extraction treatment that follows the curing treatment.

The above-described fiber-forming polymer predominantly of an uncured novolak resin is formed into a filamentary form by a customarily used suitable method such, for example, as the melt-spinning method.

The melt-spinning apparatus and operation are well known, so the description thereof will not be made in this specification. The molten mixture to be melt-spun may contain hexamethylenetetramine in such an amount as to render it capable of inducing a partial cure of the mixture but not adversely affect the melt-spinning of the molten mixture containing the uncured novolak resin, for example, in an amount of less than 5% by weight based on the uncured novolak resin. The incorporation of hexamethylenetetramine, however, is not altogether necessary, and it is sufficient that the melt-spun filament is cured using the curing reagent described above.

The known treatments such as filtration or defoaming of the molten mixture can be performed at any time before the molten mixture reaches the spinneret. The spun filament can be cured after its windup or at any time before the windup. The windup rate is usually about 200 to 2,500 meters per minute. Usually, windup rates somewhat faster than the spinning speed have a favorable effect on the tenacity of the resulting filament.

Known oils, n-paraffinic hydrocarbons, etc., can be utilized as spinning oil preparations.

The cure of the spin filament can be performed in various ways. Of greatest importance in carrying out the cure in the present invention is that the cure is not carried to the whole of the cross-section of the filament but is stopped at a point up to a depth of 20 – 90%, and preferably 40 –70%, of the cross-section of the filament extending from the peripheral portion of the filament towards the axial portion thereof. Thus, the cure of the present invention is so carried out that there is formed in the section of the filament a duplex structure consisting of a cured skin layer and an uncured core portion.

The curing operation is carried out by treating the uncured filament with a curing reagent in the presence of a curing catalyst.

Formaldehyde is most commonly used in the present invention as the curing reagent. Other curing reagents can also be used, examples being the aldehydes such as paraformaldehyde, hexamethylenetetramine, furfural, chloral or glyoxal, and the compounds which form formaldehyde on heating such, for example, as trioxane, tetroaxane or polyoxymethylene.

A basic or acidic catalyst is used for curing the filament obtained in accordance with the invention process. Examples of usable basic catalysts include ammonia, ammonium hydroxide, potassium hydroxide and hexamethylenetetramine. Hexamethylenetetramine can not only be used as a curing reagent not needing a catalyst but also as a catalyst. Examples of acidic catalysts include such mineral acids as hydrochloric acid, sulfuric acid, nitric acid, phosphoric acid, boric acid, etc., organic acids such as acetic acid, oxalic acid, formic acid, butyric acid, benzenesulfonic acid, p-toluenesulfonic acid, etc., and the mixtures thereof.

These curing reagents and curing catalysts can be either dissolved or dispersed in water or an organic solvent, for example, alcohols and ketones and be used in the form of a curing treatment liquid. In this case, water being inexpensive is most practical. The concentration of the curing reagent and the basic or acidic catalyst in the curing treatment liquid can be varied over a broad range depending upon the type and amount of the novolak resin, the type and amount of the thermoplastic synthetic resin, the denier of the filament, the way in which the curing is performed and the like and hence cannot be prescribed unqualifiedly. Howerver, in general, the curing treatment liquid can contain the curing reagent in an amount roughly of 2 – 25% by weight, preferably 5 – 20% by weight, and especially 8 – 18% by weight, and the acidic catalyst in an amount of about 5 – 25% by weight, preferably 12 – 20% by weight, and especially – 14 18% by weight, or the basic catalyst in an amount of about 1 – 10% by weight, preferably 2 – 8% by weight, and especially 3 – 5% by weight.

A typical curing treatment liquid that can be used in the present process is that composed of 5 – 20% by weight of formaldehyde, 14 – 20% by weight of hydrochloric acid and 60 – 81% by weight of water. Another is that composed of 15 – 38% by weight of formaldehyde, 1 – 5% by weight of ammonia and 84 – 57% by weight of water.

The temperature at which the cure is carried out is not critical and can vary within broad limits depending upon the type and amount of the novolak resin, the type and amount of the thermoplastic synthetic resin, the densier of the filament, the way in denier the curing is performed, the type and amount of the curing reagent, and the like. Usually a temperature ranging between room temperature and 250°C., and preferably of the order of 10° – 100°C is satisfactory.

In a most generally preferred embodiment of the invention, the contact between the uncured filament and the curing reagent in the presence of a curing catalyst is accomplished either by immersing the melt-spun filament in a bath containing an aldehyde as a curing reagent in the presence of a curing catalyst or by running the filament through such a bath. The contact can also be carried out by other means such as spraying or fuming the uncured filament with a liquid containing the curing reagent and curing catalyst.

Several modes of carrying out the cure using an aldehyde as the curing reagent in the presence of an acidic catalyst will be given. For instance, in one mode, the uncured filaments are immersed in an aqueous solution of a mixture of an acidic catalyst and an aldehyde for 5 to 20 hours at a temperature ranging from about 25° to 105°C. In another mode, the filaments are immersed in an aqueous solution of the mixture, and then the solution is gradually heated up to 50° to 105°C. for about 0.5 to 5 hours. The cure may also be effected by contacting the uncured filaments with a gaseous mixture of an acidic catalyst and an aldehyde at a temperature from 30° to 105°C. It goes without saying that these procedures may be combined. The rate at which the temperature is raised is preferably not higher than 200°C. per hour.

Several modes of carrying out the cure using an aldehyde as the curing reagent in the presence of a basic catalyst will be given. For instance, in one mode, the uncured filaments are immersed in, or caused to run through, a bath containing the aldehyde and the basic catalyst at a temperature of about 15° to 40°C. Then the temperature is gradually raised until a temperature of 40° to 105°C. is reached. The rate at which the temperature is raised should preferably not exceed 50°C. per hour. Alternatively, the uncured filaments are treated with the solution at 40° to 105°C. for 15 to 120 minutes. Needless to say, the temperature may be raised within the foregoing temperature range during the treatment. When the above-described procedures are effected under pressure, a temperature higher than 105°C. may be used. This cure may also be effected by contacting the uncured filaments with a gaseous mixture of a basic catalyst and an aldehyde at a temperature from 30° to 105°C. for 20 to 120 minutes. In this case, ammonia is usually used as the basic catalyst and formaldehyde, as the aldehyde. It is most advantageous that the cure with the basic catalyst is effected at 60° to 80° C. for 30 to 60 minutes in an aqueous solution of formaldehyde and ammonia.

The concentrations of the aldehyde and the basic catalyst are varied depending upon the treating temperature, treating time and the like. Usually, the concentration of the aldehyde is 1 to 60 % by weight, preferably 12 to 45% by weight, and most preferably 20 to 35% by weight, and the concentration of the basic catalyst is usually 0.2 to 20% by weight, preferably 1 to 10% by weight, and most preferably 2 to 5% by weight.

It is also possible to cure the uncured filament by a procedure of precuring the uncured filament with an aldehyde as a curing reagent in the presence of an acid catalyst and thereafter cure the precured filament with an aldehyde in the presence of a basic catalyst. In this case the two steps may be carried out by suitably selecting and combining the same conditions as hereinbefore indicated for the respective cases. This two-step curing has the advantage that the curing treatment to the depth prescribed above can be readily accomplished in a relatively short period of time, since there is no impairment of the filament form nor is there an indiscriminate progress of the curing reaction to the core portion of the filament. Hence, this two-step procedure is suitable for practicing the process.

The heat-curing time is optionally chosen according to the way in which the curing operation is performed, the heating temperature, the type and concentrations of the curing agent and catalyst, the type and amount of the novolak resin, the type and amount of the thermoplastic resin, the denier of the filament, etc. It is usually about 1 to 20 hours, especially 1 to 6 hours. If desired, this time can be either shorter or longer.

In short, as hereinbefore indicated, the curing treatment is carried out at a temperature and/or time such that, of the cross-sectional area of the filament, 20 – 90% becomes the cured skin layer while 80 – 10% becomes the uncured core portion.

As to whether the cured skin layer has been formed to the degree intended can be determined empirically. For instance, the degree of curing can be found in the following manner. A part of a filament in the process of being cured is taken out, the cross-section of the filament is dyed with a dye mixture possessing different dyeability, and the ratio of the areas of the differently colored cured skin layer and uncured core portion is calculated from, say, a microphotograph of the filament cross-section. Alternatively, a part of a filament being cured is taken out and subjected to a hereinafter to be described solvent extraction treatment, e.g., extraction for 3 hours with methanol at its boiling point, using a Soxhlet apparatus, to prepare a hollow filament, after which the ratio of the areas of the skin layer and the hollow portion of the filament is determined by, say, a microphotograph of the cross-section of the filament.

Thus, the time required for achieving the desired degree of cure can be found. Hence, a filament having the desired degree of cured skin layer can be readily obtained by operating the curing treatment for the time period determined in the foregoing manner.

The melt-spun filament can be drawn at any desired time before and/or after curing. The drawing often results in imparting desirable properties to the filament.

The drawing operation may be conducted in one or more stages, and the filament can be either cold or hot drawn. In the case the drawing is carried out in multistages, cold and hot drawing can be optionally combined. The draw ratio is also optional, usable being a draw ratio of usually up to 2.5 based on the length of the undrawn filament.

The filament cured as hereinabove described, after having been subjected to water-washing and/or drying, as required, is then extracted with a solvent to remove the uncured polymer portion of the core portion of the filament by elution, whereupon is obtained a hollow novolak resin filament having the hereinbefore-described properties. At this time, in proportion as the amount of the solvent is increased or the temperature at which the extraction is conducted is raised, the formation of a filament having a more clearly defined hollow portion can be achieved more promptly.

The solvents which can be used in the solvent extraction treatment include the solvents for the fiber-forming polymer composed predominantly of the uncured novolak resin. That is, when the polymer is composed solely of the novolak resin, usable are those solvents which dissolve the novolak resin and, on the other hand, when the polymer is made up of both a novolak resin and a thermoplastic synthetic resin, usable are those solvents which dissolve both of these components.

Typical examples of these solvents include the alcohols, ketones, ethers, phenols and the aqueous inorganic alkali solutions, etc., but are not limited thereto and any solvent can be used so long as it is one which dissolves the aforesaid uncured fiber-forming polymer.

As usable alcohols, mention can made of the saturated or unsaturated, straight-chain or branch-chained, mono- or polyhydric aliphatic alcohols, included being especially the lower alcohols of 1 – 6 carbon atoms, preferably those of 1 – 3 carbon atoms such as methanol, ethanol, n- or isopropyl alcohol and the like. As ketones, especially usable are the lower alkyl ketones such as acetone, methyl ethyl ketone and the like. As ethers, preferred are the cyclic ethers such as dioxane. On the other hand, as phenols, mention can be made of the aqueous solution of phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol and the like. The usable aqueous inorganic alkali solutions include the aqueous solutions of sodium hydroxide, potassium hydroxide and the like. These solvents can be used either singly or in combinations of two or more thereof. The solvent most suitable can be readily determined by a simple routine experiment. Usually, methanol, ethanol, acetone, methyl ethyl ketone and dioxane are most practical. The solvent extraction treatment can be carried out in customary manner such as by immersion of the filament in a bath containing the foregoing solvents.

In order to accelerate the elution of the uncured polymer curing the extraction treatment, it is preferred that the filaments are agitated to an extent as will not cause damage to the filaments. Further, the extraction treatment is preferably repeated at least twice.

The temperature at which the extraction treatment is conducted is not critical and can be varied over wide limits depending upon the type of novolak resin used, the type and amount of the thermoplastic synthetic resin in the case this has been blended, the extent of the cure desired, etc. Usually, a temperature ranging between 0°C. and the boiling point of the solvent used, preferably 20° – 80°C., and especially 20° – 50°C., is practical as well as convenient.

The amount of solvent is also not critical and can be varied over wide limits depending upon the type of novolak resin used, the type and amount of the thermoplastic synthetic resin in the case this has been blended, the type of solvent, the extent of cure desired, etc. The optimum amount to be used can be readily determined by a routine experiment. Usually, the use of the solvent in an amount of at least 10 milliliters, and preferably 20 – 1000 milliliters, per gram (dry basis) of the filaments to be treated is desirable. As a practical mater, an amount in the range of 50 – 100 milliliters is preferred.

The uncured core portion of the filament can be completely eluted within a period of time of the order of usually 10 minutes to 2 hours.

The aforesaid solvent extraction treatment can not only be carried out with the aforesaid cured filament in its continuous filament state but also with said filament in a state of such as a staple fiber, woven or knit fabric, felt, mat, nonwoven web and the like.

Further, the cured undrawn continuous filament or staple fiber can, as required, be drawn in the axial direction of the filament in a heated atmosphere of room temperature or 20° – 50°C. in the presence of a suitable swelling agent such as methanol or ethanol, and the like and thereafter submitted to the extraction treatment, or it can be drawn during the extraction treatment thereby yielding a hollow filament whose tensile strength has been enhanced.

Thus there is obtained a hollow resin filament consisting of a filamentary polymer predominantly of a flame-resistant and anti-fusing cured novolak resin composition and containing, if necessary, a thermoplastic synthetic resin and having a continuous structure along the axial direction of the filament, the rate of hollowness of which is 10 – 80%, and preferably 30 – 60%.

The resulting continuous hollow novolak resin filament of this invention can be directly used in the form of monofilaments, multifilaments or tows, as well as in the form of fibers cut to desired lengths. Or it can be used as spun yarn either alone or in admixture with known filaments or fibers, or in the form of twisted yarns or the like. It can also be made into various filamentary structures such as knit or woven fabrics or nonwoven fabrics either alone or in admixture with known filaments.

The hollow novolak resin filament thus obtained possesses flame-resistant and anti-fusing properties as in the case with the conventional nonhollow novolak resin filament. In addition, it possesses a flexural strength and insulation property superior to the conventional nonhollow novolak resin filament. Again, it is light and has a pliant handle.

Further, the hollow novolak resin filament demonstrates improved properties with respect to such as its dyeability, tenacity, elongation and abrasions resistance.

The so obtained hollow novolak resin filament will be converted into a new hollow carbon filament of the present invention having excellent adsorption activity by subjecting said hollow novolak resin filament to a carbonization treatment.

The carbonization treatment can be carried out by various methods similar to those employed in the production of the conventional carbon filaments. As typical, there can be mentioned that consisting of disposing the hollow novolak resin filament in a suitable reactor, heating the filament therein at a temperature of up to 600° – 1000°C. by gradually raising the temperature from room temperature at the rate, say, of 50° –1000°C. per hour, and preferably 200° – 800°C. per hour, and holding the filament at this temperature for usually 1 – 10 hours until substantially all of the polymer making up the filament is carbonized. The carbonization treatment within the foregoing range is best carried out in a nonoxidizing atmosphere, e.g., in an atmosphere of nitrogen, argon or helium. However, for shortening the carbonization time and simplifying the treatment, the heating may be carried out in air up to the intermediate temperature zone of less than 400°C. The proper carbonization temperature and rate of temperature rise can be suitably chosen from within the foregoing ranges in accordance with the type and amount of the novolak resin, the type and amount of the thermoplastic synthetic resin, the denier of the filament and the rate of hollowness of the filament.

When the carbonization temperature used is less than 600°C., a hollow carbon filament having a large surface area cannot be obtained. On the other hand, even though a temperature exceeding 1000°C. is used, practically no increase in the surface area can be expected. Hence, this also is undesirable from the economical standpoint. Preferred is a temperature ranging from 700° to 900°C., most suitable being a temperature in the range of 800° – 900°C. The rate at which the temperature is raised of less than 500°C. per hour results in prolonging the carbonization treatment time and is hence not practical. On the other hand, when the rate at which the temperature is raised exceeds 1,000°C. per hour, a sudden evolution of gas takes place in accompaniment with the thermal decomposition of the novolak resin filament, with the consequence that there is the tendency that the hollow structure of the resulting carbon filament cannot be retained. Hence, the optimum rate of temperature rise ranges between 50° and 1000°C. per hour.

Thus is obtained a hollow carbon filament having a surface area of at least 400 square meters per gram, and usually ranging from 500 to 1,000 square meters per gram, whose adsorption activity is great. This hollow carbon filament provided by the present invention can be used satisfactorily as an adsorbent of such materials as are dissolved or dispersed in, say, gas, steam contained in a gaseous atmosphere, or a liquid.

However, when it is desired to obtain a hollow carbon filament of still greater surface area, this can be achieved by subjecting the hollow carbon filament obtained as described above to a further steam activation treatment. This steam activation treatment can be carried out with steam alone or in an atmosphere containing steam; for example, by heating the hereinbefore obtained hollow carbon filament, say, in an atmosphere of a nitrogen-steam mixture at a temperature of 700° – 1000°C., preferably 750° – 900°C., for 0.1 – 5 hours, preferably 0.5 – 2 hours. Since this steam activation treatment is that which utilizes the reaction for forming the so-called water gas, the reactiofn is not practical at a temperature less than 700°C., since it is too slow. On the other hand, a treatment temperature exceeding 1,000°C. is not suitable, for the reaction proceeds too rapidly to result in not only to increase in the surface area but rather a loss of the filaments.

As a result of this steam activation treatment, a hollow carbon filament having a surface area of usually 1,000 – 3,000 square meters per gram, and preferably 1,500 – 2,500 square meters per gram, is obtained, which is a much greater surface area than that of the starting hollow carbon filament.

The rate of hollowness of the resulting hollow carbon filament is hardly affected at all by the hereinabovedescribed carbonization and steam activation treatments, and thus the rate of hollowness of the starting hollow novolak resin filament is retained intact. Hence, the hollow carbon filament provided by the present invention also possesses the rate of hollowness of 10 – 80%, and preferably 30 – 60%, the hollow structure of the filament axially extending in a continuous manner.

The carbonization and/or steam activation treatment of the aforesaid hollow novolak resin filament can be carried out using as the starting hollow novolak resin filament that of any form such as a filament, staple fiber, knit or woven fabric, nonwoven sheet or mat. Again, the hollow carbon filament obtain a result of the carbonization treatment or steam activation treatment can be processed into any of the forms indicated above. That is to say, the hollow carbon filament of the invention can be of any form, for example, a continuous filament, staple fiber, tow, yarn, knit or woven fabric, nonwoven fabric and the like.

Thus, the hollow carbon filament of the invention possess numerous advantages in that its surface area per unit weight is greater than the usual nonhollow carbon filament and its apparent density is small. Further, since it possesses an inner as well as outer surface, there is the possibility of its interesting utilization as a membrane. Hence, it finds wide use in various technical areas. Therefore, according to the present invention, there is provided a filamentary structure in a form selected from the group consisting of fibers, yarns, knit fabrics, woven fabrics, nonwoven fabrics, felt, mat and the like, such structure being composed of a carbon filament, characterized in that the carbon filament is in the form of a hollow filament whose hollow structure continuously extends in the axial direction of the filament, the rate of hollowness thereof being in the range of 10 – 80%, and the surface area of the filament being at least 400 square meters per gram.

In another aspect of the present invention, there is provided a new hollow ion-exchange novolak resin filament based on a filamentary polymer composed predominantly of a flame-resistant and anti-fusing cured novolak resin.

The new hollow ion-exchange filament can be easily produced by introducing an ion-exchangeable group in the hollow novolak resin filament described hereinbefore.

It has been found that the new hollow ion-exchanging filament of the present invention has improved ion-exchanging capacity, high ion-exchange speed and great flexural strength.

One of the reasons why improved effects are brought about in the case of the hollow ion-exchange filament of the present invention is attributable to the conditions of its production. That is to say, in the process of producing an ion-exchanging filament from the aforesaid novolak resin filament, an ion-exchangeable group such as sulfuric acid and chloromethyl ether is introduced to the benzene ring. However, it is usual that the sites to which the ion-exchangeable groups can be introduced are present mostly in the interior of the filament rather than its skin layer. This is due to the following reason. At the time of the production of the novolak resin filament, the process is so carried out as to make the filament completely infusible and insoluble to its interior core portion, with the consequence that the sites in the outer skin layer are completely blocked and, in addition, this portion is converted to a three-dimensional structure of high order. Consequently, great difficulty is experienced in introducing the ion-exchangeable groups to this portion.

According to the present invention, as hereinafter to be fully described, a hollow ion-exchange filament having a high content of the ion-exchangeable groups in its skin layer is obtained in the following manner. First, a hollow novolak resin filament is produced by imparting a minimum of the three-dimensionsal cross-linked structure to a novolak resin filament, after which the soluble portion is distilled off with a solvent such as methanol. The so obtained hollow novolak resin filament is used, and into the benzene ring thereof there is readily introduced the ion-exchangeable group to thereby obtain the intended hollow ion-exchange filament. Hence, it is apparent that the thus obtained hollow ion-exchange filament has an exchange capacity that is much greater than that of the usual ion-exchange filaments and that the ion-exchange speed is also great.

Further, since the filament is hollow, the ion-exchange treatment liquid simultaneously and readily permeates and diffuses from the outside to the inside as well as from the inside to the outside of the hollow filaments, with the consequence that a much greater acceleration of the ion-exchange speed is achieved.

The hollow ion-exchange filament having the properties such as above described can be obtained readily in accordance with the present invention by introducing an ion-exchangeable group (ion-exchange moiety) into the aforesaid hollow novolak resin filament. Alternatively, the introduction of the ion-exchangeable group can be achieved by using as the starting material the phenols that have been substituted by an ion-exchangeable group, as hereinbefore described, or by introducing the ion-exchangeable group at any point before or after spinning the fiber-forming polymer predominantly of a novolak resin composition but before curing the spun filament, or by introducing the ion-exchangeable group to the novolak resin filament during its cure or at the same time the solvent extraction is being carried out. However, since a product having a greater ion-exchange capacity can be obtained when the ion-exchangeable group is introduced to the hollow novolak resin filament of the present invention, this mode of introducing the ion-exchangeable group is most desirable, and the description hereinafter will be made with reference principally to this mode. It is however to be understood that the invention is not to be limited thereto.

As the ion-exchangeable group that can be introduced, usable are any of those ion-exchangeable groups that are usually used in the ion-exchange members having as their base the organic high molecular materials. Typical examples include the sulfonic acid group, carboxyl group, ammonium group (—NH₄), the primary, secondary and tertiary amino groups, quaternary ammonium groups, hydroxyl group and halogens. The sulfonic acid and carboxyl groups can also be in the form of a salt, for example, a sodium sulfonate group, potassium sulfonate group or sodium carboxylate group.

The primary, secondary and tertiary amino groups that can be introduced are the groups of the formula

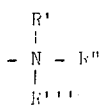

wherein R', R" and R''', which may be the same or different, are each a member selected from the group consisting of hydrogen and the $C_1$ - $C_4$ alkyl groups. As examples, mention can be made of the groups consisting of the aminomethylene group, aminoethylene group, monomethylaminomethylene group, N,N-dimethylaminopropylene group, N,N-diethylaminoethylene group, N,N-dimethylpropylene group, trimethylammonium salt group and dimethylethylammonium salt group.

On the other hand, the quaternary ammonium groups are the groups of the formula

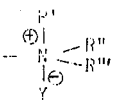

wherein R', R" and R''' are as hereinabove defined and Y⁻ is an anion such as the hydroxyl group or halogens (preferably chlorine or iodine).

The ion-exchangeable group can be introduced to the hollow novolak resin filament by methods similar to those known or by the new method that we have developed. Several typical methods will be illustrated below.

1. Introduction of the sulfonic acid group.

The invention hollow novolak resin filament is heat-treated in a sulfonating agent such as concentrated sulfuric acid, fuming sulfuric acid and chlorosulfonic acid. Alternatively, this sulfonation can also be carried out by causing the copresence of a sulfonating agent in the extraction solvent when conducting the solvent extraction of the partially cured filament. While the specific reaction conditions cannot be unqualifiedly prescribed since the conditions will vary depending upon the type of the sulfonating agent used, the type and amount of the novolak resin, the type and amount of the thermoplastic synthetic resin, the denier of the filament and the rate of hollowness, the treatment is usually carried out for 1 – 10 hours at a temperature of 0° – 150°C., preferably 20 – 130°C. with a bath ratio of 1:10 – 1:100, preferably 1:20 – 1:50. Further, the sulfonation can, if necessary, be carried out after pretreatment of the filament with a swelling agent such as benzene, o-dichlorobenzene or dimethylformamide.

After completion of the treatment, the sulfonating agent is removed from the filament, and the filament is water-washed and dried. Thus is obtained a cationic hollow ion-exchange filament having a sulfonic acid group.

Further, the resulting sulfonic acid type ion-exchange filament can be transformed to a sulfonate type ion-exchange filament by treating with an alkali solution such, for example, as sodium hydroxide or potassium hydroxide.

2. Introduction of the carboxy group.

In introducing the carboxyl group, the following two methods can be employed.

i. A method comprising reacting a hollow novolak resin filament with either a carboxyl group-containing halide such as chloroacetic acid or the caprolactones or the ring-opened compounds thereof, i.e., the oxyacids, to thereby effect the etherification of the phenolic hydroxyl group as well as the introduction of the carboxyl group.

ii. A method comprising reacting a hollow novolak resin filament with an amino acid ester such as glycine methyl ester of epsilon-aminocaproic acid methyl ester at a temperature of at least 80°C. to introduce a carboxylic acid ester group, after which the carboxyl group can be introduced by hydrolyzing the reaction product with an alkali.

3. Introduction of the ammonium group, the primary, secondary and tertiary amino groups and the quaternary ammonium groups (these groups will hereinafter be referred to generically as "amino groups").

The introduction of the amino groups is achieved by treating the aforesaid invention provided cured hollow novolak resin filament with an amination agent. This treatment may also be carried out concurrently with the aforementioned solvent extraction treatment. This latter method should also be included in the scope of the invention. The theory of the introduction of the amino group resides in introducing to the aforesaid filament the ammonium group, the primary, secondary and tertiary amino groups, and quaternary ammonium groups by treating the filament with an amination agent, utilizing principally the phenolic OH group that is possessed by the cured hollow novolak resin filament. Hence, it is readily appreciable by those skilled in the art that various modifications or combinations of the modes of operation are possible so long as the objects of the invention are not adversely affected, and it is to be understood that the methods of introducing the amino groups are not to be limited to the several modes that have been given below for illustration.

i. After treating the aforesaid hollow novolak resin filament with a halo-alkylation agent, it can be treated with an amination agent selected from ammonia and the amino compounds having at least one amino group of the class consisting of the primary, secondary and tertiary amino groups. Alternatively, the solvent extraction treatment, as described above, the aforesaid partially cured filament can be carried out in the presence of a halo-alkylation agent, after which the filament can be submitted to the treatment with an amination agent. According to this mode, a halo-alkyl group is introduced to the molecule of the cured hollow novolak filament, and then an anion-exchangeable group selected from the class consisting of the ammonium group, the primary, secondary and tertiary amino groups, and the quaternary ammonium groups can be introduced by treating the filament with an amination agent.

The conditions for carrying out the halo-alkylation and amination reactions are known per se and can be suitably chosen. Usually, the reactions are carried out for about 0.5 – 10 hours at a temperature of 20° – 100°C. with a bath ratio of 1:10 – 1:100. Further, if necessary, the novolak resin filament may be given a swelling treatment in advance of the reaction with a swelling agent such as dioxane, acetone, methyl ethyl ketone, benzene, toluene, xylene, dimethylformamide, dimethylacetamide, nitrobenzene and chlorobenzene.

Usuable as the halo-alkylation agent is a member selected from the group consisting of the monohalo-alkyl ethers having a $C_1 – C_4$ alkyl residue and the dihalo-alkyl ethers having a $C_1 – C_4$ alkyl residue. Specific examples include such as chloromethyl ether, bromomethyl ether and dichloromethyl ether.

Usable along with the foregoing halo-alkylation agent is a catalyst such as anhydrous zinc chloride, aluminum chloride and stannic chloride. In fact, the use of such a catalyst is to be preferred. After completion of the haloalkylation treatment, the unreacted halo-alkylation agent and the catalyst are decomposed and removed. Then by using an amination agent in the form, say, of an aqueous solution, alcohol solution or an aqueous alcohol solution the amination or conversion to ammonium chloride of the filament can be accomplished.

Usable as the amination agent are ammonia, the $C_1 – C_4$ monoalkylamines, $C_1 – C_4$ monoalkanolamines, $C_2 – C_8$ dialkylamines, $C_2 – C_8$ dialkanolamines, $C_3 – C_{12}$ trialkylamines, $C_3 – C_{12}$ trialkanolamines, $C_2 – C_9$ polyalkylenepolyamines and the N-alkyl substituted products thereof. Specific examples include ammonia, and the primary amino compounds such as monoethylamine, monethylamine, monopropylamine and monoethanolamine; the secondary amino compounds such as dimethylamine, diethylamine, methylethylamine, dipropylamine, piperazine and diethanolamine; the tertiary amino compounds such as trimethylamine, triethylamine, triethanolamine and N,N-dimethylethanolamine; and the polyamines such as ethylenediamine, diethylenetriamine and triethylenetetramine; or the N-alkyl substituted products thereof.

ii. After treating the hollow novolak resin filament of the present invention with an alkali metal salt-forming agent selected from the group consisting of the alkali metal hydroxides and the aliphatic lower alcohol-alkali metal mixtures, the so treated filament can then be treated with an amination agent selected from the group consisting of the compounds of the formulas

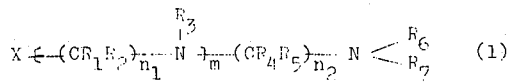

and

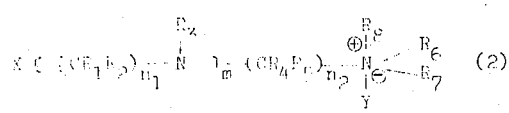

wherein X is a member selected from the group consisting of halogens, sulfuric acid ester residue and epoxy group; $R_1$, $R_2$, $R_3$, $R_4$ and $R_5$ are each a member selected from the class consisting of hydrogen and the $C_1 – C_4$ alkyl groups; $R_6$ and $R_7$ are each a member selected from the class consisting of hydrogen, the $C_1 – C_4$ alkyl groups and the group of the formula $X{-}(CR_1R_2)_{n_3}$, where X, $R_1$ and $R_2$ are as defined above, and $n_3$ is an integer from 1 to 6; $R_8$ is a member selected from the class consisting of the $C_1 – C_4$ alkyl groups, methylol and ethylol groups; Y is hydroxyl group or halogen; $n_1$ and $n_2$ are each an integer from 1 to 6, preferably 2 to 4; and m is O or an integer from 1 to 3.

In carrying out the introduction of the amino group by this mode of operation, the cured hollow novolak resin filament is preferably treated with an alkali metal salt-forming agent, such as either an alkali metal hydroxide, for example, NaOH, $NaCO_3$, KOH, $K_2CO_3$, etc. or a mixture of an aliphatic lower alcohol, e.g., as $C_1 – C_4$ alcohol and an alkali metal, e.g., sodium or potassium and thereafter treated with the aforesaid amination agent. For instance, the filament is treated with either an aqueous NaOH solution of the order of 0.1 – 3 normality or an alcohol-alkali metal mixture containing about 0.5 – 50 grams of the alkali metal per liter of alcohol, thus converting the phenolic OH group of the cured hollow novolak resin filament to an alkali metal salt, after which the filament can be treated with the amination agent. The treatment by means of the alkali metal salt-forming agent can be carried out for about 1 – 5 hours at a temperature of about 20° – 60°C. When the highest possible temperature is used, a treatment time on the short side should be adopted. In this method, the above described treatment is preferable but not essential. For instance, where group X represents an epoxy group in above formulas (1) and (2), such treatment may be omitted.

When the cured hollow novolak resin filament, which has been treated or not, as above described, with the alkali metal salt-forming agent, is then treated with an amination agent of the above-given formulas (1) or (2), the contact of the filament with the amination agent is preferably carried out in a polar solvent such as water, alcohol, dioxane and dimethylformamide or a nonpolar solvent such as benzene or toluene. This treatment is preferably carried out at the lowest possible temperature. For instance, a treatment for about 30 minutes — 2 hours at 0° – 50°C. should be sufficient.

As specific examples of the amination agents of the aforesaid formulas (1) and (2), mention can be made of the monoalkynolamine derivatives such as 1-chlorodimethylamine, 1-bromodiethylamine, 2-chloroethyleneamine, 2-chloroethylenemethylamine, 2-chloroethylenediethylamine, 2-chloroethylenedipropylamine, 2-chloroethylenedibutylamine, 3-chloropropyleneamine, 3-chloropropylenedimethylamine, 3-bromopropylenediethylamine, 4-chlorobutylenedimethylamine and 4-bromobutylenediethylamine, as well as the dialkylolamine derivatives and the trialkylolamine derivatives such and N,N-dichloroethylmethylamine and N,N,N-trichloroethylamine. Further, the condensation products such, for example, as N-2-chloroethylethylenediamine and N,N-dimethyl-N'-chloroethylethylenediamine, which are readily obtained from the foregoing compounds, or the quaternary ammonium salts thereof can be mentioned.

iii. The hollow novalak resin filament provided by the present invention can be treated with an amination agent selected from the group consisting of the compounds of the formulas

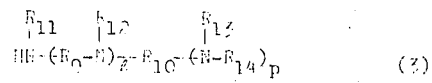

and

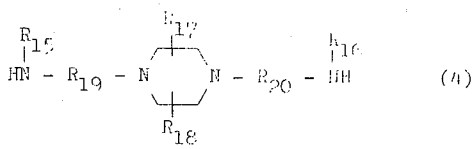

wherein $R_9$ is an alkylene group, preferably a $C_1 - C_4$ alkylene group; $R_{10}$ is an alkylene group, preferably a $C_1 - C_4$ alkylene group, when p is 1, and is a member selected from the class consisting of hydrogen, the $C_1 - C_{10}$ groups and the group of the formula

where $R_9$ is as above defined and $R_{11}$ is as hereinafter defined, when $p$ is 0; $R_{11}$, $R_{12}$, $R_{13}$, $R_{14}$, $R_{15}$, $R_{16}$, $R_{17}$ and $R_{18}$ are each a member selected from the class consisting of hydrogen and the $C_1 - C_4$ alkyl groups; $R_{19}$ and $R_{20}$ are each of the class consisting of the $C_1 - C_{10}$ methylene and polymethylene groups; 1 is 0 or an integer from 1 to 50; and $p$ is 0 or 1; and the quaternary ammonium salts thereof at a temperature preferably of 100° – 200°C.

When the foregoing amination agent is a liquid under the above-indicated conditions in which its contact is made with the hollow novolak resin filament, the treatment can be carried out by contacting it with the hollow novolak resin filament by immersion, spraying or any other optional method. On the other hand, when the amination agent is in a solid state under the above-indicated conditions in which its contact is made with the filament, the treatment can be carried out by effecting the contact of the amination agent with the filament in the former's solvent solution state, using a suitable solvent, the solution being preferably one of high concentration.

As the solvent to be used in this case, there can be named such, for example, as dioxane, tetrahydrofurane, dimethylformamide, dimethylacetamide and nitrobenzene.

The foregoing amination agents that are used in this mode not only are an anion-exchangeable group introduction agent but in many cases act also as a swelling agent of the novolak resin filament. Hence, when the amination agent is a liquid under the contacting conditions, they are best used as such. Needless to say, the solvents such as indicated above can also be used. On the other hand, as the solvent to be used when the amination agent is a solid under the contacting conditions, preferably chosen is one, such as indicated above, having a swelling action on the novolak resin filament, using said solvent in an amount of 10 – 50% by weight of the amination agent.

The treatment of the hollow novolak resin filament with the foregoing amination agent is preferably carried out under heating, since in this case the swelling action on the filament and the reaction speed are enhanced. Usually, a temperature of above 100°C., e.g., of the order of 100° – 200°C., can be employed, particularly preferred being a temperature of 120° – 180°C. While the reaction proceeds smoothly at temperatures exceeding 180°C., there is the possibility of the degradation of the novolak resin filament itself to result in the possibility of a decline of the properties of the filament as well as a reduction in the anion-exchange capacity. Hence, the choice of a temperature in the range of about 100° – 180°C. is to be preferred. The reaction can be carried out at normal atmospheric pressure of under superatmospheric pressure, there being no particular restriction in this respect.

As the amination agent of the hereinabove-given formulas (3) and (4), which are to be used in this mode of operation, preferred are the compounds having at least one tertiary amino group. Further, for enhancing the ion-exchange capacity of the resulting anion-exchange hollow novolak resin filament, a compound having at least three basic nitrogen atoms in its molecule is preferred. In addition, in view of the previously indicated reaction conditions and the molecular structure of the novolak resin filament, a compound having a molecular weight of 80 – 1000 and a boiling point of above 130°C. is to be preferred.

As specific examples of the amination agent of formula (3) to be used in the above-described mode of the present invention, included are the monoalkylamines as well as the diamines such as ethylene diamine, propylene diamine, hexamethylenediamine and nonamethylenediamine and the polyamines such as diethylenetriamine and triethylenetetramine and the N-alkylsubstituted products thereof; typical of which are such, for example, as N,N-dimethylethylenediamine and N,N-dimethylpropylenediamine as well as N,N-di(beta-aminoethyl)methylamine, N,N-di(beta-aminopropyl) ethylamine, N,N'-dimethyl-N,N'-di-beta-aminoethyl-ethylenediamine, N,N'-dimethyl-N,N'-di-gamma-aminopropyl-ethylenediamine and N,-N'-diisobutyl-di-gamma-propylhexamethylenediamine. On the other hand, as examples of the amination agents of formula (4), mention can be made of such as N,N'-di(aminomethyl)-piperazine, N,N'-di(aminomethyl)-methylpiperazine, N,N'-di(beta-aminoethyl)-piperazine, N,N'-di(gamma-aminopropyl)-piperazine, N,N'-di(gamma-aminopropyl)-2,5-dimethylpiperazine and N-(gamma-aminopropyl)-N'-(aminomethyl)-piperazine. Also usable in like manner are the diamines obtained by the aminoalkylation of the glycols, e.g., the benzene ring-containing diamines such as bis-1,2(gamma-aminopropoxy)-ethane or xylidenediamine. In addition, usable in like manner are the quaternary ammonium salt type of amino compounds of the foregoing amino compounds.

The novolak resin filament introduced with either a primary, secondary or tertiary amino group by one of the above-described several modes of introducing the amino group according to the present invention can now be converted into a novolak resin filament introduced with a quaternary ammonium group by the quaternizing treatment which per se is known. For instance, the novolak resin filament introduced with a tertiary amino group can be very readily converted to a strongly basic anion-exchange hollow novolak resin filament by treating the former filament with a quaternizing agent such as dimethyl sulfate, diethyl sulfate, a methyl halide or an ethyl halide at a temperature of 0° – 80°C. for 10 minutes – 3 hours. Further, if necessary, the so obtained filament can be transformed into a hydroxyl type by treating it with an aqueous solution of a caustic alkali such as caustic soda or caustic potash, or it can be transformed into a halide type by treatment with an alkali metal halide such as sodium chloride or potassium chloride.

Thus, there is obtained the hollow ion-exchange filament of the present invention having substantially the same rate of hollowness as that of the starting hollow novolak resin filament, i.e. rate of hollowness in the range of 10–80%, preferably 30–60%, the hollow structure of the filament continuously extending in the axial direction of the filament.

As described above, hollow ion-exchange novolak resin filament having a high rate of strength retention during swelling can be provided by the use of the hereinbefore-described hollow novolak resin filament. Further, it is possible to obtain filaments having the desired rate of strength retention during swelling by varying the rate of hollowness of the novolak resin filament by controlling the degree of cure that the uncured as-spun novolak resin filament is given. In general, since the elongation of the filament drops somewhat with a rise in the rate of hollowness, a filament having an elongation and strength retention rate during swelling most suited for the use to which it is intended can be obtained by a suitable choice of the rate of hollowness of the intended filament. Again, it is possible to provide an anion-exchangeable hollow novolak resin filament demonstrating a high exchange capacity of about 1 – 8 meq/g, usually 3 – 6 meq/g, by a suitable choice of the means of introducing the anion-exchangeable group, for example, the class of the amination agent, the introduction conditions, etc., along with the foregoing conditions.

Thus there is provided a hollow ion-exchange filament whose exchane capacity per unit weight is great and exchange speed is fast, with the consequence that high speed treatment is made possible even with a compact apparatus.

The hereinabove treatment for introducing the ion-exchange group can be carried out regardless of whether the starting novolak resin filament is in the form of a filament, staple fiber, knit or woven fabric, or nonwoven fabric. Alternatively, the filament resulting after the treatment of introducing the ion-exchangeable group can be processed into such forms as staple fiber, knit or woven fabric, or nonwoven fabric.

Therefore, according to the present invention, there is also provided a filamentary structure in a form, selected from the group consisting of fibers, yarns, knit fabrics, woven fabrics, nonwoven fabrics, felt, mat and the like, said structure being composed of a filamentary material derived from a filamentary polymer composed predominantly of a flame-resistant and anti-fusing cured novolak resin being introduced an ion-exchangeable group, characterized in that the filamentary material is in the form of a hollow filament whose hollow structure continuously extends in the axial direction of the filament, the rate of hollowness thereof being in the range of 10–80%.

Thus, the hollow ion-exchange filament provided by the present invention can not only be used in such various forms for various purposes such, for example, as the ion exchange in the various kinds of liquids being treated or the removal of colloidal material, but also as filter material in treating various liquids, especially at elevated temperatures, because of its excellent insulation and flame-resistant properties as well as superior dimensional stability. Further, since it is biochemically stable, its application in the biochemical field can be expected. Again, in view of its stability to radioactivity, there is hope for its use in such areas as the treatment of industrial waste water in the atomic power industry. In addition, it can be applied to the reverse osmotic process.

The following examples are given for more fully illustrating the invention.

EXAMPLE 1

A. 1,410 g of phenol, 1,180 g of formalin (37% aqueous solution of formaldehyde), 20 g of oxalic acid and 300 g of methanol were mixed, and reacted at 100°C. for 3 hours with stirring. A large quantity of cold water was added to the mixture to stop the reaction. The reaction product was dissolved in methanol, and the solution was heated at reduced pressure to evaporate off the unreacted phenol, formaldehyde and methanol and some water. There was obtained a thermoplastic novolak resin having a number average molecular weight of 820.

500 g of the resulting novolak resin was coarsely pulverized, thoroughly dried, and then placed in a 1-liter stainless steel vessel adapted to be heated externally. After the vessel had been repeatedly purged with nitrogen gas, the novolak resin was melted at 160°C. The molten novolak resin was extruded from a nozzle held at 160°C. and having 18 holes with a diameter of 2.5 mm at a rate of 3 g/min. through a gear pump at the bottom of the stainless steel dissolving vessel. The filaments were taken up at a spinning rate of 1,050 m/min. on bobbins by a winder provided at a position 1.5 m below the nozzle.

The novolak filaments were taken up on two bobbins for 15 minutes each. One of the bobbins was left as it was, but the filaments on the other bobbin were cut and removed from the bobbin in the form of tow.

B. The novolak filaments in the form of tow prepared in (A) above (100 g) were immersed for 30 minutes in one liter of a mixed aqueous solution containing 18% by weight of formaldehyde and 18% by weight of hydrochloric acid, and then in the course of 4 hours, gradually heated to 95°C. to cure the filaments. The filaments inside were withdrawn, and immediately washed repeatedly with cold water. The filaments were further washed with hot water held at about 90°C., then, fully dehydrated, and without drying, placed in 1 liter of methanol, followed by heating for 1 hour at 60°C. within a vessel provided with a refluxer to dissolve the uncured portion (core portion) of the novolak resin. The filaments were then washed with fresh methanol and water consecutively and dried to form hollow filaments. The sectional areas of the filaments were photographed microscopically, and the rate of hollowness was measured and found to be 62%.

For comparison, the above curing treatment was continued, and when the treating temperature reached 95°C., the curing reaction was performed for an additional 4 hours. Then, the cured filaments were dehydrated, and washed with water repeatedly, and the remaining hydrochloric acid was neutralized with aqueous ammonia. The filaments were further washed fully and dried to form filaments which were entirely cured.

The properties of the filaments prepared above were measured, and the results are shown in Table 1 below.

the resulting filaments and the ion exchange capacities are shown in Table 2.

Table 1

| Sample filaments | Tenacity (g/d) | Elongation (%) | Flexural strength (times)* | Apparent density | Degree of heat insulation (minutes)** |
| --- | --- | --- | --- | --- | --- |
| Hollow filament of this invention | 1.78 | 21.3 | 3,700 | 0.58 | 150 |
| Comparison filament | 1.80 | 25.6 | 1,100 | 1.25 | 40 |

*The flexural strength is expressed by the number of flexing of a single filament under a load of 0.5 g/d until the filament broke.
**The degree of heat insulation is the time required for the center of a ball with a diameter of 5 cm made of 5 g of the filament to attain a temperature of 100°C. when the ball is maintained in an atmosphere at 100°C.

When the filament of this invention was exposed to flame, it was only carbonized without showing any combustibility as in the case of the comparison filament.

C. Ten grams of the hollow novolak filaments prepared in (B) above were disposed in a transverse-type reaction furnace. After the air inside the furnace had been removed by nitrogen gas, the temperature was raised from room temperature (25°C.) to 700°C. at a rate of 600°C./hour. At this temperature, the fibers were reacted for 30 minutes. By flowing a small amount of nitrogen gas during this time, the oxidation of the fibers curing to the inflow of air was prevented. After having been cooled to room temperature, the filaments were taken out. There were obtained 5.5 g of carbonized filaments having a surface area of 750 m$^2$/g. The filaments had a rate of hollowness of 59% which was almost the same as that of the starting phenol filaments.

Carbonized filaments were obtained by baking the comparison filaments prepared in (B) above. The yielded amount was 5.6 g, and the surface area was 480 m$^2$/g.

Using the hollow carbonized filaments of this invention and the comparison carbonized filaments, a test was conducted to remove methylene blue from a solution of methylene blue by the following procedure.

To 50 cc of an aqueous solution of methylene blue assuming a dark blue color (concentration of 100 mg/$l$) was added 0.1 g of the hollow carbonized filaments. The mixture was stirred, and allowed to stand for one day. The solution became almost colorless and transparent, and the rate of removal of methylene blue as measured from the percentage permeation was 98%. On the other hand, when the comparison carbonized filaments were used, the rate of removal was only 75%, and a blue color was still observed.

D. Hollow novolak filaments obtained by the same procedure as in (B) above were sulfonated to prepare hollow ion-exchanged filaments by the following procedure.

Ten grams of the hollow filaments were mixed with 500 g of 25% fuming sulfuric acid to sulfonate them for a predetermined period of time. Then, the fuming sulfuric acid was removed, and the filaments were thoroughly washed with water and dried in vacuo at 70°C. to form cation-exchanged filaments of the sulfonnic acid type.

The cation-exchanged filaments were then immersed for 20 hours in a 1/10 N NaOH aqueous solution to measure their ion exchange capacity. The properties of Table 2

| Sulfonation Reaction time (hours) | Ion exchange capacity meq)g) | Tenacity (g/d) | Quality of filaments* | | Apparent density |
| --- | --- | --- | --- | --- | --- |
| | | | Elongation (%) | Bending strength (times) | |
| 0 | 0 | 1.18 | 21.3 | 3700 | 0.58 |
| 1 | 1.8 | 1.11 | 18.1 | 3100 | 0.60 |
| 5 | 3.9 | 0.87 | 16.2 | 2700 | 0.64 |
| 10 | 4.2 | 0.82 | 15.0 | 2500 | 0.65 |

*Number of bending until the filament breaks under a load of 0.5 g/d.

The section of the hollow ion-exchanged filament was photographed microscopically, and the rate of hollowness was measured and found to be 55 to 65%.

In order to compare the ion-exchange velocities of these filaments, the following test was performed.

The following two samples were used. A. a sample obtained by converting the hollow ion-exchanged filament of the sulfonic acid type shown in Table 2 which had an ion exchange capacity of 1.8 meq./g to the sulfonate salt type using sodium hydroxide.

B. granular ion-exchange resin (Amberlite TR-120B, sulfonate salt type; product of Rohm and Haas)

one-hundred and fifty ml. of each of these samples was packed into a glass adsorbing tower equipped with a cock at its top and bottom and having a diameter of 30 mm and a height of 500 mm at a packing density of 0.30 g/ml. On the other hand, an aqueous solution of ferric chloride (200 ppm) was passed through the tower at a temperature of 25°C. and a flow rate of 600 ml./min. to remove ferric ions. The ferric ion concentration of the treating water was determined, and the results are shown in Table 3.

Table 3

| Samples | Concentration of ferric chloride after treatment (ppm) Treating time (minutes) | | | |
| --- | --- | --- | --- | --- |
| | 10 | 30 | 50 | 100 |
| A (invention) | 1.2 | 1.4 | 2.2 | 5.8 |
| B (comparison) | 7.2 | 7.5 | 8.3 | 12.0 |

From the results shown in Table 3, it can be concluded that the hollow ion-exchanged filaments of this invention have an extremely high velocity of adsorbing ferric ions, and such a high speed treatment can be fully performed. When the hollow filaments which had adsorbed the ferric ions were regenerated in a customary manner, and tested again, there was no change in adsorbability, pressure drop, etc., and such fibers were found to have superior durability.

of 0.25 g/ml., and an aqueous solution of purified potassium bichromate (100 ppm) was passed through the column at a flow rate of 500 ml./min. to adsorb and remove chromate ions. The concentration of chromate ions in the treating liquid was determined. The results are shown in Table 5.

Table 5

| Ion-exchange capacity (meq/g) | Properties of the filament | | | Concentration of $K_2Cr_2O_7$ in the treating liquid(ppm) Treating time (min.) | | | |
|---|---|---|---|---|---|---|---|
| | Tenacity (g/d) | Elongation (%) | Bending strength (times) | 10 | 50 | 100 | 200 |
| 1.7 | 1.02 | 20.1 | 3200 | 0.5 | 0.7 | 1.0 | 1.5 |

EXAMPLE 2

Hollow novolak filaments prepared in the same way as in Example 1 (B) were carbonized under the same conditions as set forth in Example 1 (C) except that the final temperature was 900°C. When this temperature was reached, cooling was immediately started.

The resulting carbonized filaments had a surface area of 880 m²/g and a rate of hollowness of 61%. The yield was 5.4 g.

A predetermined amount of the hollow carbonized filaments was added to 50 cc of an aqueous solution of methylene blue (concentration 200 mg/liter), and the mixture was stirred for one day, followed by filtration. The rate of removal of methylene blue was measured from the percent permeation of the filtrate. The results are shown in Table 4.

Table 4

| Amount added (g) | Rate of removal (%) |
|---|---|
| 0.1 | 93.4 |
| 0.2 | 98.6 |
| 0.3 | 99.9 |
| 0.4 | 100.0 |

EXAMPLE 3

Ten g of the same hollow phenol filaments as prepared in Example 1 (B) were placed in a mixed bath containing 500 g of chloromethyl ether and 30 g of stannic chloride anhydride, and reacted with stirring for 10 hours at 50°C. After the end of the reaction, an excess of the chloromethyl ether and stannic chloride was decomposed, and the resulting chloromethylated hollow filaments were thoroughly washed with water.

To the washed chloromethylated filaments were added 300 g of a 30% aqueous solution of trimethylamine, and the reaction was performed for 6 hours at 45°C. The filaments were then withdrawn, and there were obtained hollow anion-exchanged filaments having a quaternary ammonium salt group. The filaments were dried at 60°C. under reduced pressure, and then their exchange capacity was measured.

As a comparative sample, anion-exchanged filaments were prepared by quite the same method as above using the entirely cured filaments obtained in Example 1.

The adsorbability of the filaments obtained above towards potassium bichromate was determined as follows:

The filaments (40 g) were packed into the same glass column as used in Example 1 (D) at a packing density It can be seen from Table 5 that the hollow ion-exchanged filaments in accordance with the present invention have a large exchange capacity and superior adsorbability to potassium bichromate.

EXAMPLE 4

A. Four hundred and fifty g of a thermoplastic novolak resin having a number average molecular weight prepared in the same way as in Example 1 (A) were mixed and melted together with 50 g of 6 nylon having a relative viscosity, as measured on 98% sulfuric acid at 30°C., of 3.10 in an atmosphere of nitrogen at 200°C. to form a novolak-6 nylon mixed resin.

The mixed resin obtained was pulverized coarsely and fully dried. It was then spun in the same way as in Example 1 (A), and wound up on bobbins as continuous filaments.

The continuous filaments on the bobbins were cured in the same way as in Example 2. The filaments so cured were wound back on a paper cone, and then knitted by a circular knitting machine. 20 g of the resulting knitted fabric was put into a vessel equipped with a reflux condenser, and 500 cc of dioxane was poured into it. It was then maintained in the boiled state for 15 minutes. Immediately then, 500 cc of fresh dioxane was exchanged, and for an additional 15 minutes, the uncured portion (core portion) of the filaments was dissolved. The fabric was thoroughly washed with water repeatedly and dried. The monofilaments that constituted the fabric were pulled out, and examined microscopically. As a result, it was found that the filaments had a rate of hollowness of 31%.

As a comparative experiment, the knitted fabric before treatment with dioxane was cured in the same formaldehyde/ammonia mixed aqueous solution as used above for 2 hours at 80°C. to cure the constituent filaments entirely. Then, the fabric was thoroughly washed with water, and dried.

Each of the two knitted fabrics so treated was folded quadruply, and a weight of 50 g was placed on it, and this state was maintained for 15 minutes. Then, the weight was removed. While the control fabric remained folded on removal of the weight, the fabric consisting of the hollow filaments of this invention repelled, and rose to such an extent that the folded portion could not be ascertained.

The other filament of the 6 nylon-novolak mixture whose uncured central portion is not removed was cut to a length of 30 cm. Both ends of the two-like filament were fixed to a manually-operable drawing machine, and immersed in methanol held at 50°C. Then, it was gradually drawn to 1.7 times the original length, and in the fixed state, maintained in methanol for 1.5 hours at 50°C. The drawn filaments were removed, and used for various tests. The results are shown in Table 6.

For comparison, the results obtained with hollow filaments which were prepared under the same conditions as above except that the filaments were not drawn are also shown in Table 6.

Table 6

|  | Rate of hollowness(%) | Tenacity (g/d) | Elongation (%) | Bending strength | Degree of heat insulation(min.) |
| --- | --- | --- | --- | --- | --- |
| Filament of this invention | 35 | 2.81 | 15.4 | 1500 | 120 |
| Comparative filament | 38 | 2.05 | 30.2 | 410 | 130 |

B. The hollow cured filament obtained in (A) above was carbonized in accordance with the procedure of Example 1 (C) to form a hollow carbonized filament in a yield of 41%. The surface area of the filament was 850 m²/g, and the filament exhibited superior absorbability toward benzene.

C. The hollow cured filament obtained in (A) above was sulfonated in accordance with the procedure of Example 1 (D) to form a hollow cation-exchange filament, which was found to have an exchange capacity of 2.9 meq/g and exhibit superior adsorbability toward lead ions.

EXAMPLE 5

Hollow novolak filaments having a rate of hollowness of 40% were prepared by the same method as in Example 1 (B).

Ten g of the hollow novolak filaments were placed in a reaction furnace and carbonized in a stream of nitrogen while heating up to 800°C. at a rate of 300°C. per hour. When the temperature reached 800°C., steam was fed into the furnace at a rate of 30 g/hour together with nitrogen to activate the carbonized filaments for a predetermined period of time indicated in Table 8. The activation time, the yield of the hollow carbonized filaments and the surface area of the filaments are shown in Table 8.

Table 8

| Activation time (minutes) | Yield(g) | Surface area (m²/g) | Rate of hollowness(%) |
| --- | --- | --- | --- |
| 0 | 5.4 | 810 | 39 |
| 30 | 4.0 | 1500 | 36 |
| 60 | 2.8 | 2050 | 37 |
| 120 | 1.2 | 2800 | 37 |

EXAMPLE 6

Various phenol filaments having various rates of hollowness were prepared by the same method as in Example 1 (B) except that the curing time was changed. 20 g of each of the filaments were packed in a reaction tube, and heated up to 900°C. at a rate of 200°C. per hour in a stream of nitrogen and maintained at this temperature for 30 minutes to carbonize the filaments. Furthermore, steam was fed into the reaction tube at a rate of 30 g per hour, and the filaments were activated for 50 minutes.

0.1 g of the resulting hollow carbonized filaments was immersed for a predetermined time in 50 cc of an aqueous solution of potassium bichromate (concentration 300 mg/liter), and the concentration of the filtrate was measured. From the results obtained, the degree of decoloration was calculated.

Table 9

| Rate of hollowness (%) | Yield (g) | Surface area (m²/g) | Degree of decoloration (%) Immersion time (minutes) | | | |
| --- | --- | --- | --- | --- | --- | --- |
| | | | 1 | 10 | 60 | 600 |
| 0 | 5.4 | 1500 | 65.0 | 80.7 | 82.5 | 84.1 |
| 9 | 5.2 | 2100 | 71.1 | 87.2 | 94.3 | 94.8 |
| 18 | 4.9 | 2400 | 94.9 | 98.2 | 98.0 | 98.0 |
| 54 | 5.0 | 2300 | 95.6 | 98.3 | 98.2 | 98.4 |
| 72 | 4.9 | 2600 | 95.0 | 98.1 | 98.1 | 98.6 |
| 83 | 4.7 | 2200 | 94.3 | 97.5 | 97.9 | 97.8 |

It is seen from the above results that the filaments having a rate of hollowness of less than 10% had a slow velocity of decoloration (adsorption of potassium bichromate), and non-hollow filaments had slow velocity of decoloration and a reduced amount of adsorption. The filaments having a hollowness rate of 83% were partly broken, and powderized.

EXAMPLE 7

Novolak filaments prepared in accordance with Example 1 (A) were cured for a predetermined period of time using a mixed aqueous solution containing 18% of hydrochloric acid and 18% of formaldehyde. The uncured portion of the filaments was dissolved using a methanol solution held at 60°C. Hollow phenol filaments having various rates of hollowness were obtained.

Each of the hollow filaments was sulfonated using 25% fuming sulfuric acid at 60°C. for 5 hours, and then treated with alkali to form Na-type hollow cation-exchange filaments.

The rate of hollowness and the ion exchange capacity were measured. The filaments were caused to adsorb cadmium chloride from its aqueous solution having a concentration of 250 ppm using the same column as in Example 1 (D) at a packing density of 0.20 g/ml. The aqueous solution of cadmium chloride was passed through the column at a flow rate of 500 ml/min. for 30 minutes. The concentration of cadmium chloride was then measured. The results are shown in Table 10.

Table 10

| | Rate of hollowness (%) | Exchange capacity (meq./g) | Concentration of cadmium chloride |
| --- | --- | --- | --- |
| Comparison | 5 | 2.2 | 3.1 |
| Invention | 12 | 2.8 | 2.3 |
| Invention | 33 | 3.5 | 1.2 |
| Invention | 45 | 3.8 | 0.5 |
| Invention | 58 | 4.0 | 0.5 |

Table 10-Continued

|  | Rate of hollowness (%) | Exchange capacity (meq./g) | Concentration of cadmium chloride |
|---|---|---|---|
| Invention | 77 | 3.2 | 1.8 |
| Comparison | 86 | 2.7 | 2.1 |

In view of the ion exchange capacity and the velocity of adsorption of cadmium, the rate of hollowness is suitably at least 10%, preferably 30–60%.

If the tenacity, bending strength and economy of the filaments are also considered, the hollow ion-exchanged filaments of this invention suitably have a rate of hollowness of 10 to 80%, preferably 30 to 60%.

EXAMPLE 8

Anion-exchange filaments were prepared by the following two methods using the hollow novolak filaments having a rate of hollowness of 62% which were prepared in Example 1 (B).

1. 10 g of the filaments were immersed in a solution consisting of 100 g of N,N-dimethyl propylene diamine and 200 g of dimethyl formamide, and reacted for 2 hours at 110°C. The filaments were withdrawn, washed thoroughly with water, dried, immersed at room temperature in a 30% methanol solution of methyl iodide, and reacted for 30 hours. The filaments were washed with methanol, and then with water, and dried in a hot air circulating type dryer held at 50°C. The ability of the resulting strongly basic anion-exchange filaments to decompose NaCl was measured, and found to be 3.1 meq/g.

2. 10 g of the hollow novolak filaments were immersed in one liter of a 0.5N NaOH solution at 40°C. and treated for one hour with stirring. 2.5 g of chloroethyldiethylamine hydrochloride was added to the mixture over a period of 30 minutes, and then further reacted for 2 hours at 40°C. After the end of the reaction, the filaments were withdrawn, washed with water and dried. The ion exchange capacity of the anion-exchange filaments into which tertiary amino groups had been introduced was measured, and found to be 3.4 meq/g.

EXAMPLE 9

One hundred g of the tow-like novolak filaments prepared in Example 1 (A) were immersed in an aqueous solution containing 14% by weight of hydrochloric acid and 16% by weight of formaldehyde at room temperature, and heated up to 95°C. in the course of one hour. The filaments were immediately withdrawn, and washed with water, followed by immersion in an aqueous solution containing 30 % by weight of formaldehyde and 2.5% by weight of ammonia. The filaments were reacted at 95°C. for 10 minutes in this aqueous solution. The resulting filaments were treated with a 85% aqueous solution of methanol for 30 minutes at 60°C. The treated filaments were washed with water and dried to form hollow novolak filaments having a rate of hollowness of 55%. The filaments were chloromethylated in accordance with the procedure of Example 4, and then reacted in a methanol solution containing 35% of triethylamine with stirring for 3 hours at 50°C. to form hollow anion-exchange filaments containing a quaternary ammonium salt group. The ion exchange capacity was 2.3 meq/g.

EXAMPLE 10

Ten g of the hollow novolak filaments prepared in Example 1 (B) were immersed in one liter of a 1N aqueous solution of NaOH, and treated for 30 minutes at 40°C. After treatment, 50 g of monochloroacetic acid were added, and caused to react on the filaments for 3 hours at 45°C. The resulting filaments were thoroughly washed with water and dried, and converted to the H type. The ion exchange capacity was measured using one-tenth N-NaOH, and found to be 1.5 meq/g.

EXAMPLE 11

Ten g of the hollow novolak filaments prepared in Example 1 (B) were immersed in a mixed solution consisting of 500 g of glycine ethyl ester and 500 g of dimethyl acetamide, and reacted for 5 hours at 85°C. After the end of the reaction, the filaments were thoroughly washed with water, immersed in one-fifth N-NaOH, and treated for 2 hours at 50°C. After the treatment, the filaments were immersed in ½ N-HCl for 24 hours at room temperature, thoroughly washed with water, and dried to form cation-exchange filaments containing a carboxyl group. The exchange capacity was 1.2 meq./g.

What we claim is:

1. A hollow ion-exchange novolak resin filament consisting essentially of from 50 to 100% by weight of a flame-resistant and anti-fusing cured novolak resin having an ion-exchange moiety and from 0 to 50% by weight of a fiber-forming thermoplastic synthetic resin selected from at least one of the group consisting of polyamide, polyester, polyolefin and polyurethane, with the provisos that the hollow structure continuously extends in the axial direction of the filament, and the rate of hollowness is from 10 to 80%.

2. The filament of claim 1 in which the thermoplastic synthetic resin is present.

3. The filament of claim 2 in which the thermoplastic synthetic resin is selected from at least one of the group consisting of nylon 5, nylon 11, nylon 12, nylon 66, nylon 610, nylon 611, nylon 612, polyethylene terephthalate, polyethylene oxybenzoate, polyethylene and polypropylene.

4. The filament of claim 3 in which the thermoplastic synthetic resin is nylon.

5. The filament of claim 1 in which the ion-exchange moiety is selected from the group consisting of: sulfonic acid-; carboxyl-; ammonium; primary, secondary and tertiary amino-; quaternary amino-: hydroxyl-; and halogen-moieties.

6. The filament of claim 1 in which the rate of hollowness is from 30 to 60%.

7. A filamentary structure derived from the filamentary polymer of claim 1.

8. The filamentary structure of claim 7 wherein said structure is in a form selected from fibers, yarns, knit fabrics, woven fabrics, non-woven fabrics, felt, or matting.

9. A filamentary structure derived from the filamentary polymer of claim 2.

10. The filamentary structure of claim 9 wherein said structure is in a form selected from fibers, yarns, knit fabrics, woven fabrics, non-woven fabrics, felt, or matting.

* * * * *